US006889404B2

(12) United States Patent
Lu et al.

(10) Patent No.: US 6,889,404 B2
(45) Date of Patent: May 10, 2005

(54) HEIGHT-ADJUSTABLE HINGE FOR A LIQUID CRYSTAL DISPLAY

(75) Inventors: Sheng-Nan Lu, Shulin (TW); Hsiang-Chi Chien, Shulin (TW)

(73) Assignee: Shin Zu Shing Co., Ltd., Shulin (TW)

( * ) Notice: Subject to any disclaimer, the term of this patent is extended or adjusted under 35 U.S.C. 154(b) by 0 days.

(21) Appl. No.: 10/622,225

(22) Filed: Jul. 18, 2003

(65) Prior Publication Data

US 2005/0011045 A1    Jan. 20, 2005

(51) Int. Cl.$^7$ ............................................... E05F 1/08
(52) U.S. Cl. ........................... 16/287; 16/288; 361/681
(58) Field of Search .................. 16/287, 288; 361/681; 248/919, 920

(56) References Cited

U.S. PATENT DOCUMENTS

| | | | |
|---|---|---|---|
| 2,870,477 A * | 1/1959 | Anthony et al. ............... | 16/321 |
| 3,351,975 A * | 11/1967 | Koji ............................. | 16/288 |
| 4,382,312 A * | 5/1983 | Liggett et al. ................ | 16/365 |
| 5,471,709 A * | 12/1995 | Lanzani ........................ | 16/238 |
| 5,664,290 A * | 9/1997 | Scherrer ....................... | 16/370 |
| 6,243,918 B1 * | 6/2001 | Zetti ............................ | 16/298 |
| 6,269,521 B1 * | 8/2001 | Gabel ........................... | 16/287 |
| 6,374,459 B1 * | 4/2002 | Zetti ............................ | 16/366 |
| 6,499,189 B2 * | 12/2002 | Kondo et al. .................. | 16/289 |
| 6,574,835 B2 * | 6/2003 | Melhuish ...................... | 16/282 |

* cited by examiner

Primary Examiner—Suzanne Dino Barrett
Assistant Examiner—Mark Williams
(74) Attorney, Agent, or Firm—Alan D. Kamrath; Nickolai & Mersereau, P.A.

(57) ABSTRACT

A hinge includes a bracket, two fixing seats pivotally connected to the bracket, at least one base, at least one first arm pivotally connected between the at least one base and the at least one fixing seat and at least one second arm pivotally connected between the at least one base and the at least one fixing seat. At least one spring is provided between the at least one second arm and the at least one base such that when both the at least one first and second arms are pivoted relative to the at least one base, the required recovery force is provided to facilitate the upward movement of the bracket relative to the at least one base.

20 Claims, 6 Drawing Sheets

HEIGHT-ADJUSTABLE HINGE FOR A LIQUID CRYSTAL DISPLAY

BACKGROUND OF THE INVENTION

1. Field of the Invention

The present invention relates to a hinge, and more particularly to a hinge which is able to provide a height-adjustable feature to a liquid crystal display (LCD) to provide more convenient observation alternatives.

2. Description of Related Art

As well known in the art, a hinge is provided between two objects so as to provide a pivotal relationship between the two objects. Examples can be seen everywhere in our lives. A common example is the LCD of a computer, wherein the LCD pivots about a central axis so that various observation angles are provided to different operators. However, in order to protect the LCD from damage, the pivotal angle of the LCD is limited within a certain range. That is, the pivotal movement of the LCD is stopped when the LCD is pivoted to a critical angle. Consequently, if the operator is shorter than average or is a child, the mere pivotal movement of the LCD can not provide satisfactory service to meet the requirements.

To overcome the shortcomings, the present invention tends to provide an improved hinge to mitigate the aforementioned problems.

SUMMARY OF THE INVENTION

The primary objective of the present invention is to provide an improved hinge that not only enables the display to pivot but also allows the display to be raised and lowered.

Another objective of the present invention is to provide a hinge having a positioning device so that when the display is pivoted, the positioning device is able to protect the display from damage through excessive travel.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
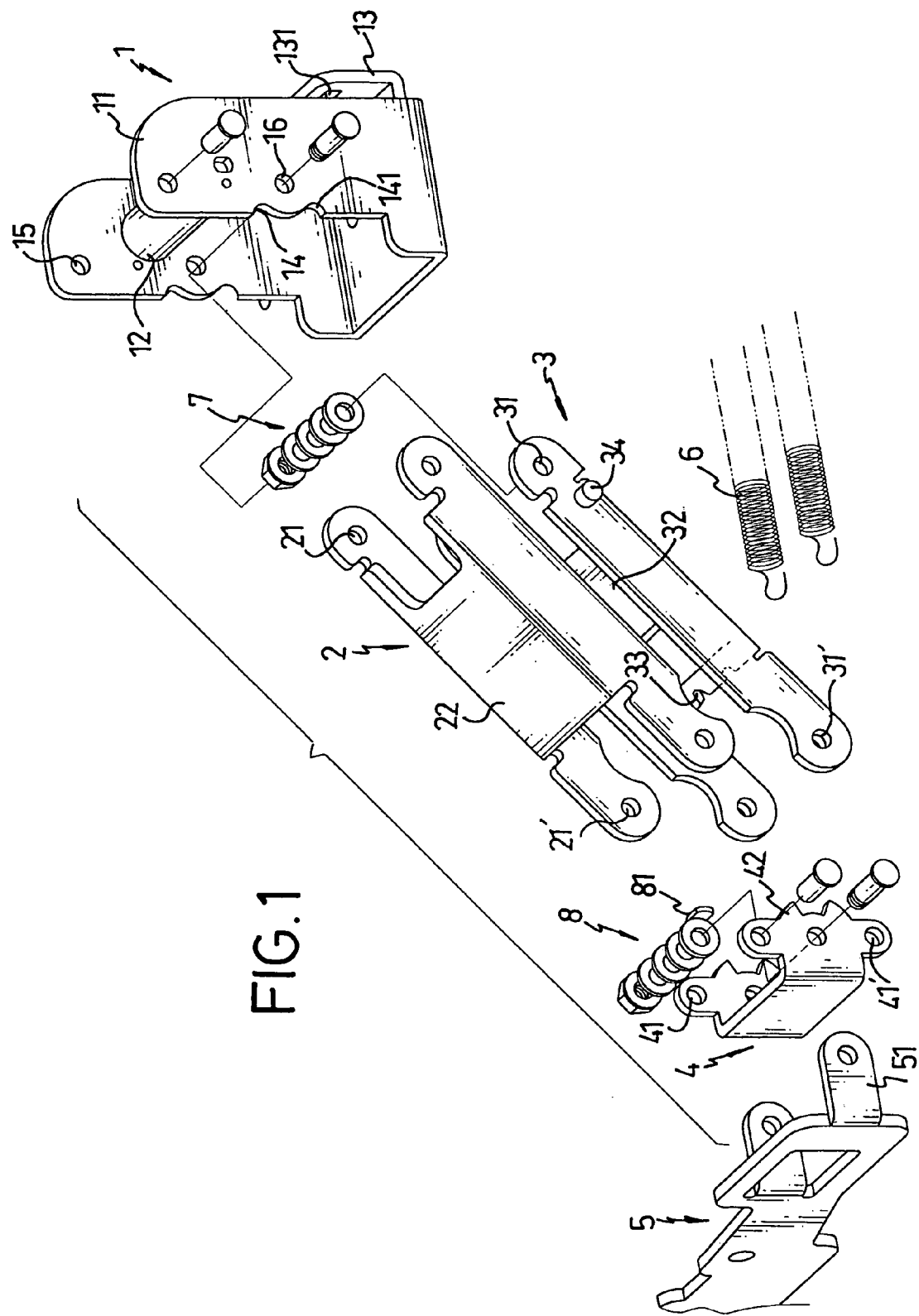
FIG. 1 is an exploded perspective view of the hinge of the present invention.

With reference to FIG. 1, the hinge in accordance with the present invention includes a base (1), a first arm (2), a second arm (3), a fixing seat (4) and a bracket (5).

The base (1) includes two upright walls (11) each with a first hole (15) and a second hole (16) aligned with the first and second hole (15,16) of the other upright wall (11) respectively, a shaft (12) securely sandwiched between the two upright walls (11) and a fixing plate (13) integrally extending out between the two upright walls (11) and having a fixing hole (131) defined therein. A saddle (14) having two positioning recesses (141) is defined in a side face of each of the two upright walls (11).

The first arm (2) is composed of two arms each having a first and a second pivot hole (21,21') defined in two distal ends thereof and a bridge (22) securely connecting the two arms together.

The second arm (3) is composed of two arms each having a first and a second pivot hole (31,31') defined in two distal ends thereof and a bridge (32) securely connecting the two arms together and defining in a side face thereof at least one (two are shown in this preferred embodiment) connecting hole (33). A limiting block (34) is formed on a side face of each of the two arms of the second arm (3) to correspond to the saddle (14) of the base (1).

The fixing seat (4) has two pairs of through holes (41,41') defined in a top portion and a bottom portion of the fixing seat (4) and two positioning wedges (42) formed on a side face of the fixing seat (4) between the two pairs of through holes (41,41').

The bracket (5) is elongated and has two extensions (51) extending out from a distal end of the bracket (5) to correspond to the fixing seat (4).

Figure 2:
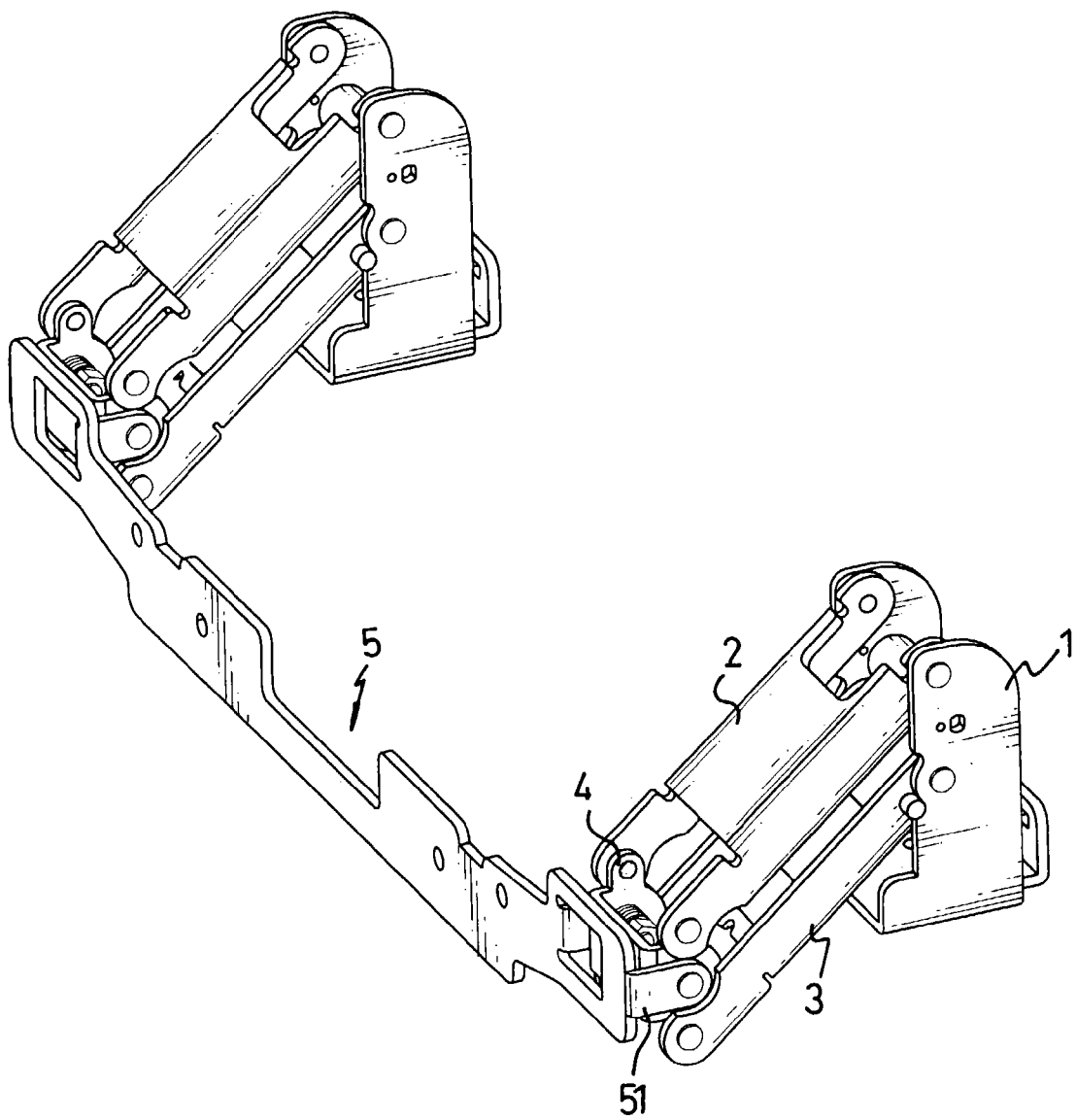
FIG. 2 is a perspective view showing the hinge of the present invention in assembly.

With reference to FIG. 2 and still using FIG. 1 for reference, when the hinge of the present invention is in assembly, the two first pivot holes (21) of the first arm (2) are aligned with the two first holes (15) of the two upright walls (11) and then a retaining device such as screw and nut combination is used to secure the engagement between the first arm and the base (1). The first pivot holes (31) of the second arm (3) are aligned with the second holes (16) of the two upright walls (11) and then a first washer assembly (7) is provided between the two arms of the second arm (3) and a side face of each of the two upright walls (11) to secure engagement between the second arm (3) and the base (1). After the engagement between the first arm (2) and the base (1) and between the second arm (3) and the base (1), it is noted that the first arm (2) and the second arm (3) are pivotal relative to the base (1).

Thereafter, at least one (two are shown) spring (6) is provided and has a first end thereof connected to the connecting hole (33) of the second arm (3) and a second end thereof connected to the fixing hole (131) of the fixing plate (13) of the base (1). Then, the second pivot holes (21') of the first arm (2) are aligned with the first pair of through holes (41) of the fixing seat (4) and the second pivot holes (31') of the second arm (3) are aligned with the second pair of through holes (41') of the fixing seat (4). A retaining device such as a screw and a nut combination is used to secure engagement between the fixing seat (4) and the first arm (2) and the engagement between the fixing seat (4) and the second arm (3). After the engagement between the first and second arms (2,3) and the fixing seat (4), it is learned that the first and second arm (2,3) is pivotal relative to the fixing seat (4). Then a second washer assembly (8) is applied to secure engagement between the fixing seat (4) and the bracket (5). That is, a bolt is extended through a side face of the fixing seat (4) and a side face of the extension (51) and into a series of washers. Eventually, a nut is provided to secure the engagement between the fixing seat (4) and the bracket (5). Due to the provision of a stop (81) formed on one of the washers and corresponding to the positioning wedges (42), pivotal movement of the second washer assembly (8) is limited.

Figure 3:
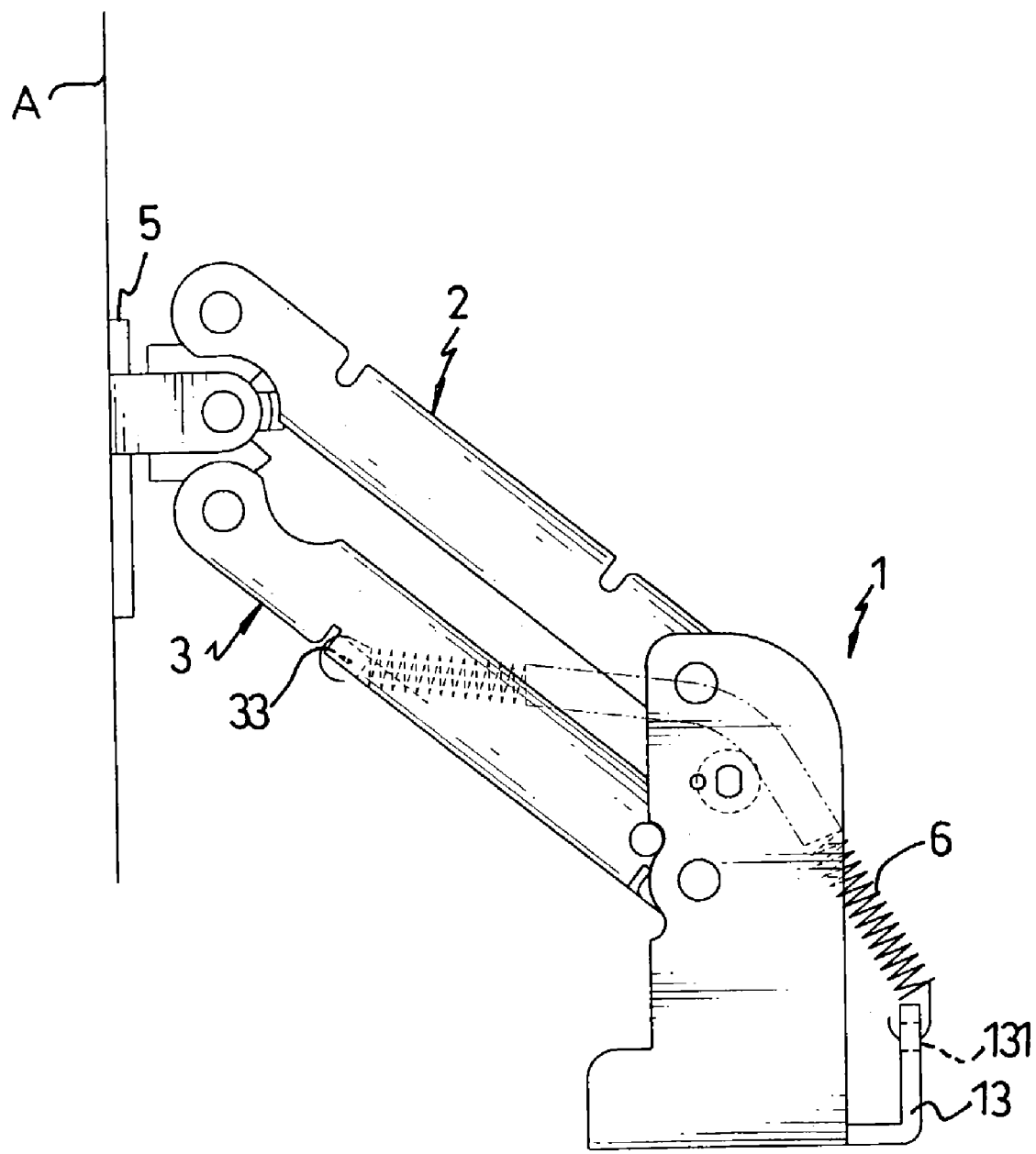
FIGS. 3 and 4 are side views showing that the display attached to the hinge of the present invention is raised and lowered by the use of the hinge.
Figure 4:
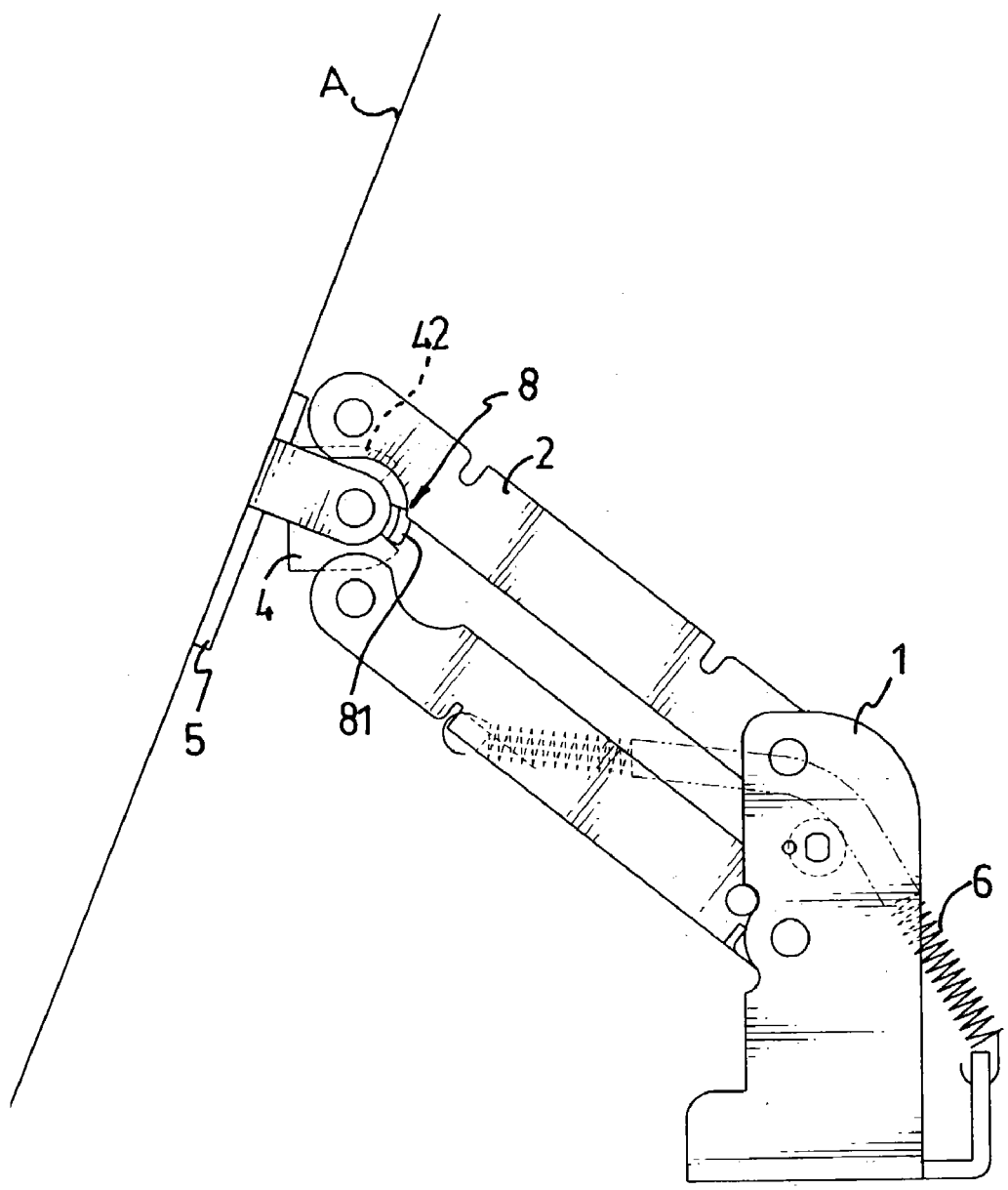

With reference to FIGS. 3 and 4, it is noted that the first arm (2) and the second arm (3) are arranged in parallel and the first arm (2) is on top of the second arm (3). When a display (A) securely attached to the bracket (5) is about to be moved upward or downward, due to the pivotal engagement between the bracket (5) and the fixing seat (4) and the pivotal engagement of the first and second arm (2,3) with the base (1), the bracket (5) together with the display (A) is able to be moved to different latitudes. Besides, when the display (A) is moved downward, the spring (6) is extended so that when the display (A) is about to be moved upward, the recovery force stored in the spring (6) is released, which helps the operator use less effort to move the display (A) upward. Still, when the display (A) is moved upward and downward, the limiting block (34) moves back and forth in the positioning recesses (141) of the saddle (14).

Figure 5:
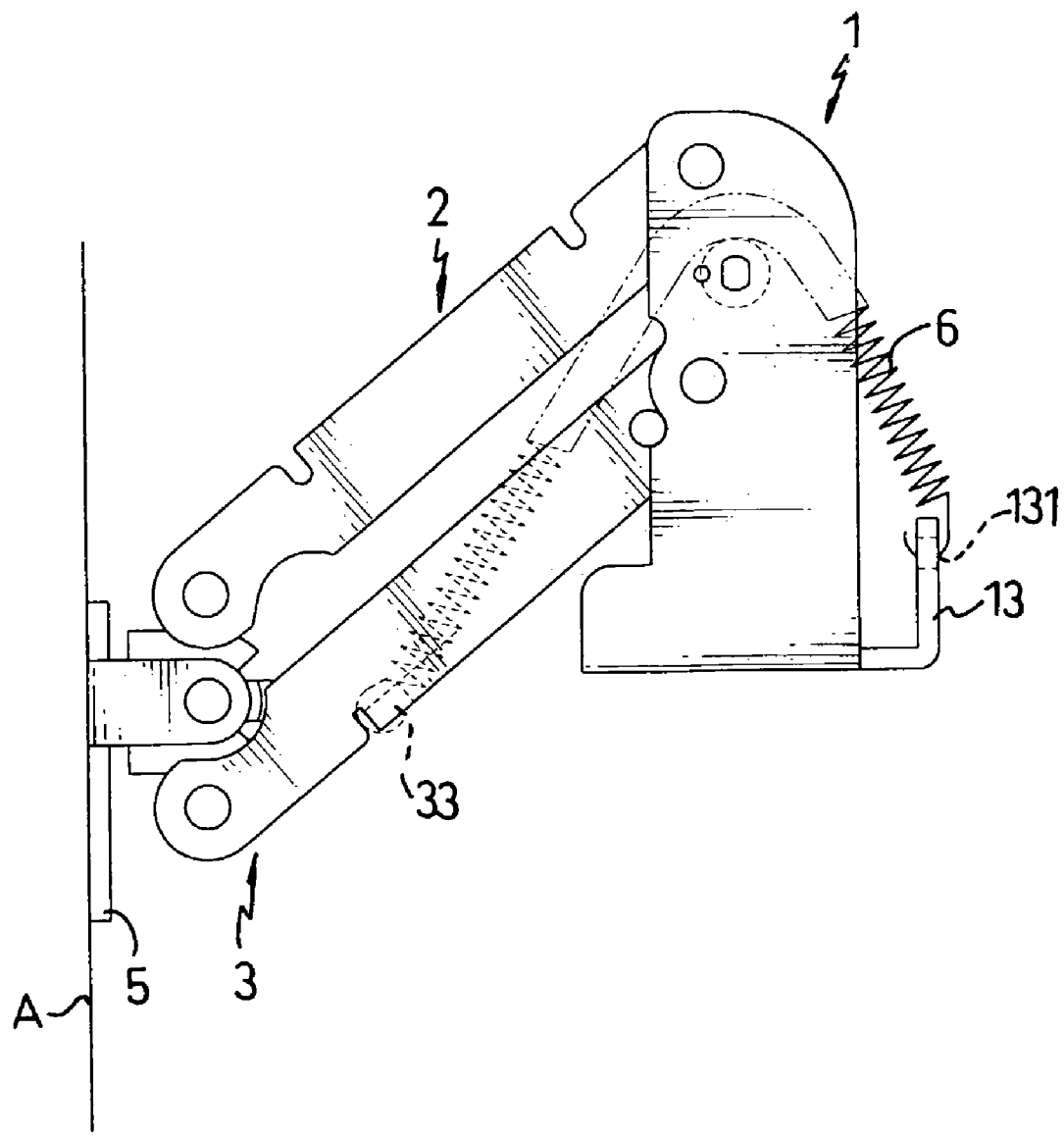
FIG. 5 is a side view showing that the display is pivoted relative to a fixture of the hinge of the present invention.

With reference to FIG. 5, again, because the bracket (5) is pivotally connected to the fixing seat (4), the bracket (5) together with the display (A) is able to pivot relative to the fixing seat (4) such that the display (A) is able to have angle adjustment ability. While the display (A) angle is being adjusted, the stop (81) moves between the two positioning wedges (42), which limits the angle adjustment of the display (A) so that the display (A) is protected from damage.

Figure 6:
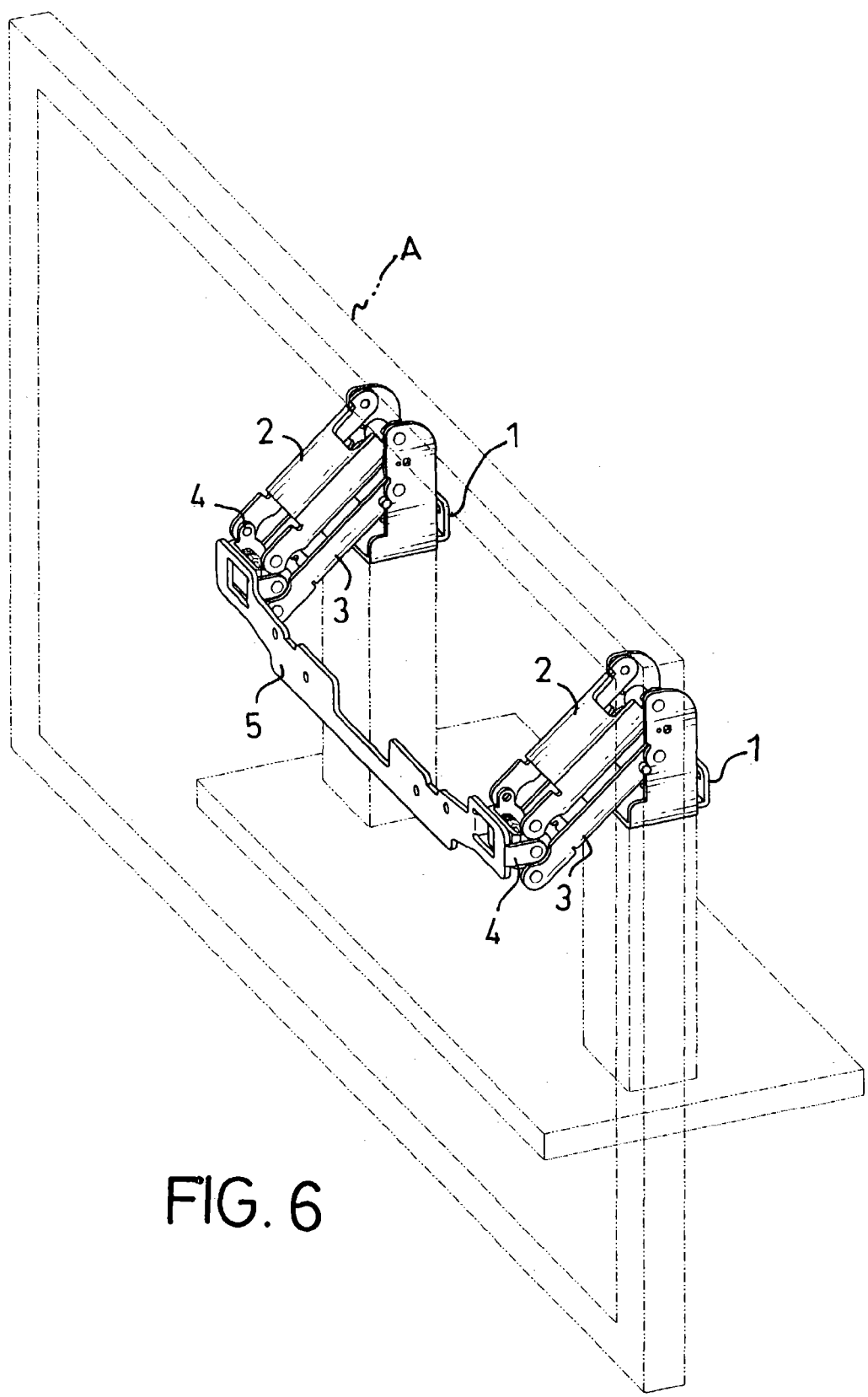
FIG. 6 is a schematic view showing the application of the hinge to a back of the display.

With reference to FIG. 6, it is noted that when the hinge of the present invention is in application to support the display (A), the base (1) is securely mounted on a support (not numbered and shown in dotted lines). The hinge has, in total, one bracket (5), two fixing seats (4) pivotally connected to two distal ends of the bracket (5), two first arms (2), two second arms (3), and two bases (1) respectively and pivotally connected to one first arm (2) and one second arm (3). Furthermore, the quantity of the spring (6) that is provided between the second arm (3) and the base (1) can be increased to two. The first washer assembly (7) may be sandwiched only by one upright wall (11) and one side face of the second arm (3). The second washer assembly (8) may be provided on only one side face of the fixing seat (4) to provide the necessary friction to support the display (A) attached to the bracket (5).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge comprising:
    an elongated bracket adapted to be securely connected to a display;
    at least one fixing seat pivotally connected to the bracket and having two pairs of through holes respectively defined in a top portion and a bottom portion of the fixing seat;
    at least one base adapted to securely connected to a support and having two upright walls each having a first pivot hole and a second pivot hole;
    at least one first arm having a first end pivotally connected to the first pivot holes of the two upright walls and a second end pivotally connected to one of the two pairs of through holes; and
    at least one second arm having a first end pivotally connected to the second pivotal holes of the two upright walls and a second end pivotally connected to the other pair of the two pairs of through holes of the fixing seat such that the display attached to the bracket is able to have height and angle adjustment,
    wherein a side face of the two upright walls is formed with a saddle having positioning recesses defined therein and a limiting block is formed on a side face of the at least one second arm to correspond to the positioning recesses such that when the at least one second arm is pivoted relative to the base, the limiting block is moving in the positioning recesses to provide a temporary positioning effect to the at least one second arm.

2. The hinge as claimed in claim 1 further comprising:
    a shaft extending between the two upright walls; and
    at least one spring having a first end securely connected to a connecting hole in a side face of the second arm and a second end extending over the shaft and connected to the base to provide a recovery force to the bracket when the bracket is moving from a lower position to an upper position.

3. The hinge as claimed in claim 2, wherein the base further has a fixing plate extending out from the two upright walls and having a fixing hole such that the second end of the spring is able to be securely connected to the fixing hole to provide the recovery force.

4. The hinge as claimed in claim 3, wherein the at least one first arm is composed of two arms and a bridge securely connecting the two arms together, each arm of the at least one first arm has a first pivotal hole and a second pivotal hole, and
    wherein the at least one second arm is composed of two arms and a bridge securely connecting the two arms together, each arm of the at least one second arm has a first pivotal hole and a second pivotal hole
    whereby the at least one first arm has two first pivotal holes which are aligned with the first holes of the two upright walls and two second pivotal holes which are aligned with one pair of the two pairs of through holes of the fixing scat, the at least one second arm has two first pivotal holes which are aligned with the second holes of the two upright walls and two second pivotal holes which are aligned with the other one pair of the two pairs of through holes of the fixing seat.

5. The hinge as claimed in claim 4, wherein at least one first washer assembly is applied to a pivotal engagement between the at least one second arm and one of the two upright walls to provide necessary friction.

6. The hinge as claimed in claim 5, wherein at least one second washer assembly is applied to a pivotal engagement between the fixing seat and the bracket to provide a necessary friction.

7. The hinge as claimed in claim 6, wherein the at least one fixing seat has two positioning wedges formed on a side face of the at least one fixing scat and the second washer assembly has a stop formed to correspond to the two positioning wedges so that when the bracket is pivoted relative to the at least one fixing seat, movement of the stop between the two positioning wedges prevents excessive travel of the display.

8. The hinge as claimed in claim 4, wherein at least one second washer assembly is applied to a pivotal engagement between the fixing seat and the bracket to provide a necessary friction.

9. The hinge as claimed in claim 8, wherein the at least one fixing seat has two positioning wedges formed on a side face of the at least one fixing seat and the second washer assembly has a stop formed to correspond to the two positioning wedges so that when the bracket is pivoted relative to the at least one fixing seat, movement of the stop between the two positioning wedges prevents excessive travel of the display.

10. The hinge as claimed in claim 3, wherein at least one first washer assembly is applied to a pivotal engagement between the at least one second arm and one of the two upright walls to provide necessary friction.

11. The hinge as claimed in claim 3, wherein at least one second washer assembly is applied to a pivotal engagement between the fixing seat and the bracket to provide a necessary friction.

12. The hinge as claimed in claim 11, a wherein the at least one fixing seat has two positioning wedges formed on a side face of the at least one fixing seat and the second washer assembly has a stop formed to correspond to the two positioning wedges so that when the bracket is pivoted relative to the at least one fixing seat, movement of the stop between the two positioning wedges prevents excessive travel of the display.

13. The hinge as claimed in claim 2, wherein the shaft is securely sandwiched between the two upright walls.

14. The hinge as claimed in claim 1, wherein at least one first washer assembly is applied to a pivotal engagement between the at least one second arm and one of the two upright walls to provide necessary friction.

15. The hinge as claimed in claim 1, wherein at least one second washer assembly is applied to a pivotal engagement between the fixing seat and the bracket to provide a necessary friction.

16. The hinge as claimed in claim 15, wherein the at least one fixing seat has two positioning wedges formed on a side face of the at least one fixing seat and the second washer assembly has a stop formed to correspond to the two positioning wedges so that when the bracket is pivoted relative to the at least one fixing seat, movement of the stop between the two positioning wedges prevents excessive travel of the display.

17. A hinge comprising:
 an elongated bracket adapted to be securely connected to a display;
 at least one fixing seat pivotally connected to the bracket and having two pairs of through holes respectively defined in a top portion and a bottom portion of the fixing seat;
 at least one base adapted to securely connected to a support and having two upright walls each having a first pivot hole and a second pivot hole;
 at least one first arm having a first end pivotally connected to the first pivot holes of the two upright walls and a second end pivotally connected to one of the two pairs of through holes;
 at least one second arm having a first end pivotally connected to the second pivot holes of the two upright walls and a second end pivotally connected to the other pair of the two pairs of through holes of the fixing seat such that the display attached to the bracket is able to have height and angle adjustment, wherein the at least one fixing seat has two positioning wedges formed on a side face of the at least one fixing seat; and
 a second washer assembly applied to a pivotal engagement between the fixing seat and the bracket, wherein the second washer assembly has a stop formed to correspond to the two positioning wedges so that when the bracket is pivoted relative to the at least one fixing seat, movement of the stop between the two positioning wedges prevents excessive travel of the display.

18. The hinge as claimed in claim 17 further comprising:
 a shaft extending between the two upright walls; and
 at least one spring having a first end securely connected to a connecting hole in a side face of the second arm and a second end extending over the shaft and connected to the base to provide a recovery force to the bracket when the bracket is moving from a lower position to an upper position.

19. The hinge as claimed in claim 18, wherein the shaft is securely sandwiched between the two upright walls.

20. The hinge as claimed in claim 18, wherein the base further has a fixing plate extending out from the two upright walls and having a fixing hole such that the second end of the spring is able to be securely connected to the fixing hole to provide the recovery force.

* * * * *